United States Patent
Steul

(10) Patent No.: US 8,300,799 B2
(45) Date of Patent: Oct. 30, 2012

(54) CAMPAIGN MANAGER

(75) Inventor: Donald R. Steul, San Francisco, CA (US)

(73) Assignee: Apptera, Inc., Sunnyvale, CA (US)

( * ) Notice: Subject to any disclaimer, the term of this patent is extended or adjusted under 35 U.S.C. 154(b) by 1190 days.

(21) Appl. No.: 12/074,242

(22) Filed: Feb. 28, 2008

(65) Prior Publication Data

US 2008/0221975 A1   Sep. 11, 2008

Related U.S. Application Data

(60) Provisional application No. 60/903,963, filed on Feb. 28, 2007.

(51) Int. Cl.
*H04M 3/00* (2006.01)
(52) U.S. Cl. ......... 379/266.07; 379/265.01; 379/265.02; 705/14.4; 705/14.41; 705/14.42
(58) Field of Classification Search ............. 379/266.07, 379/265.01, 265.02; 705/14.4, 14.41, 14.42
See application file for complete search history.

(56) References Cited

U.S. PATENT DOCUMENTS

| | | | |
|---|---|---|---|
| 7,536,002 B1 * | 5/2009 | Ma et al. ................. | 379/266.02 |
| 2004/0034561 A1 * | 2/2004 | Smith ............................ | 705/14 |
| 2007/0155411 A1 * | 7/2007 | Morrison ..................... | 455/466 |
| 2008/0247534 A1 | 10/2008 | Steul et al. | |

* cited by examiner

*Primary Examiner* — Khai N Nguyen
(74) *Attorney, Agent, or Firm* — Schwegman Lundberg Woessner, P.A.

(57) ABSTRACT

A process identifies multiple campaign activation points associated with a voice-based menu hierarchy such that the voice-based menu hierarchy is accessed by multiple callers. The process continues by identifying a campaign associated with the voice-based menu hierarchy and determining a campaign value associated with the campaign. Additionally, the process determines an opt-in rate associated with the campaign and determines a likelihood that callers will reach each campaign activation point. A score associated with the campaign is then calculated for each campaign activation point.

14 Claims, 7 Drawing Sheets

CAMPAIGN MANAGER

RELATED APPLICATIONS

This application claims the benefit of U.S. Provisional Application No. 60/903,963, filed Feb. 28, 2007, the disclosure of which is incorporated by reference herein.

TECHNICAL FIELD

The present invention relates to campaign management, such as managing one or more advertising campaigns.

BACKGROUND

Various mechanisms are available for delivering advertisements, promotional offers, and other information to customers and other individuals or entities. These mechanisms include print advertising, direct mail offers, email advertisements, web-based marketing, telephone calls, and the like. The effectiveness of certain mechanisms have been reduced recently for various reasons. For example, the effectiveness of email advertising has diminished due to the increased usage of spam blockers and spam filters. Similarly, "do not call" legislation has placed limitations on outbound calls.

Inbound calls remain an effective mechanism for communicating with customers and other individuals or entities. For example, during a typical inbound phone call, the caller has fewer distractions than when viewing a web page or other advertising mechanism. Generally, the caller is listening to the audio information provided via the telephone or other communication device. Also, since the caller initiated the inbound call, the caller is specifically interested in talking with the entity receiving the call to ask a question, place an order, or obtain other information. Thus, it is valuable to provide a campaign manager that handles inbound calls and other communications with customers as well as other individuals and entities.

BRIEF DESCRIPTION OF THE DRAWINGS

Similar reference numbers are used throughout the figures to reference like components and/or features.

DETAILED DESCRIPTION

The systems and methods described herein manage one or more campaigns, such as advertising campaigns, and the like. In particular, the disclosed systems and methods enable targeted, revenue generating and/or informational campaigns within, for example, voice applications or other systems. In certain implementations, these systems and methods allow businesses to up-sell, cross-sell, or communicate more effectively with inbound callers and other customers. Additional tools are provided that allow campaign managers to determine where to place particular campaigns within a voice-based menu hierarchy.

In particular embodiments, a "user" is also referred to as a "caller". Certain systems and methods described herein receive calls (or requests for calls) from various callers. For example, callers may place calls to request directory assistance (also referred to as a "411 service"), call a business, call a friend, and so forth. The caller may invoke a call via a conventional telephone system, using voice over internet protocol (VoIP), or any other communication system.

Particular examples discussed herein refer to receiving calls via a telephone or a cellular phone. However, the systems and methods described herein may also be utilized to process calls received from any source using any type of data communication mechanism and any kind of data response mechanism.

Figure 1:
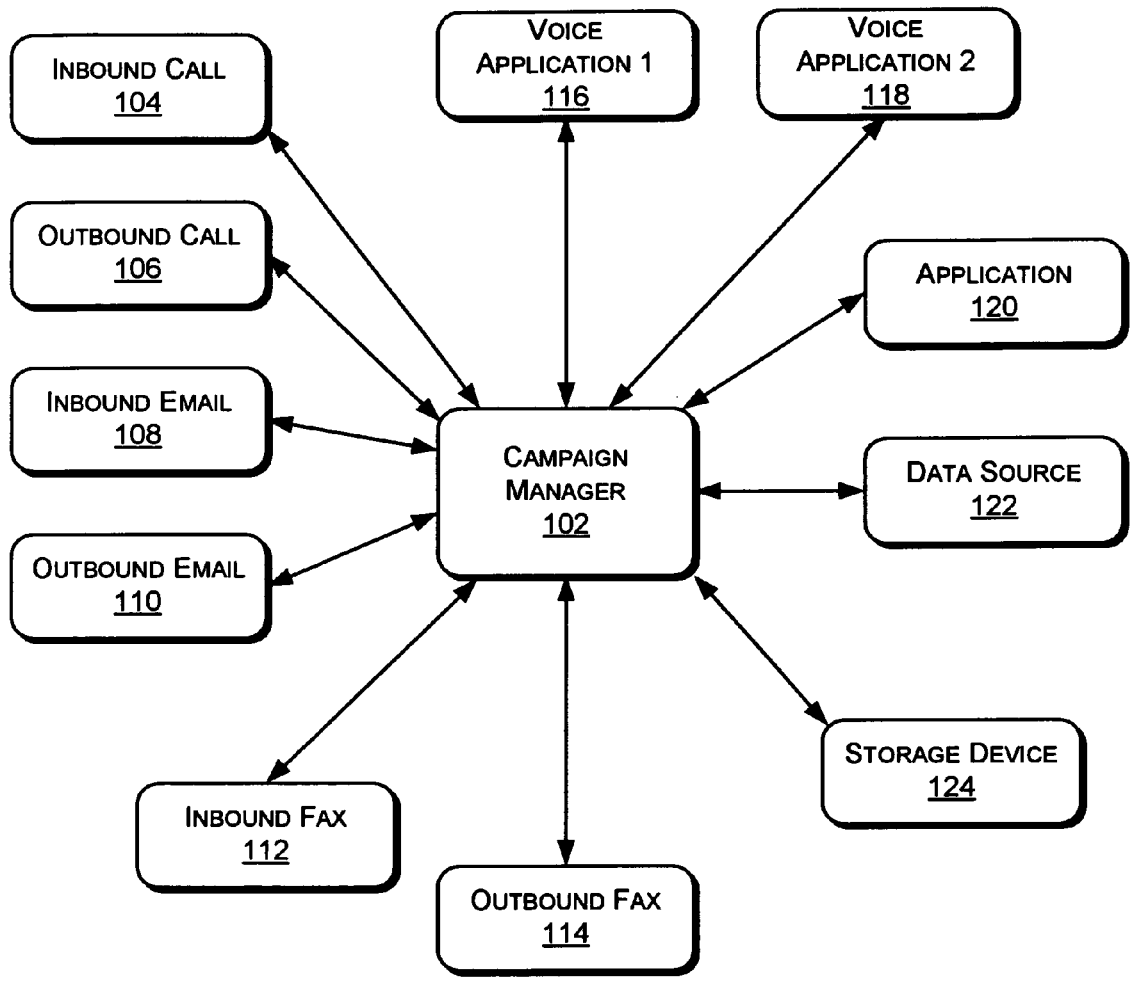
FIG. 1 illustrates multiple campaign-related services, systems, applications, and devices that may interact with a campaign manager.

FIG. 1 illustrates multiple campaign-related services, systems, applications, and devices that may interact with a campaign manager 102. Campaign manager 102 is capable of performing a variety of campaign-related functions as described herein. Campaign manager 102 is coupled to receive inbound calls 104 and generate outbound calls 106. Campaign manager 102 can handle any number of inbound calls 104 and outbound calls 106 simultaneously. Campaign manager 102 is also coupled to receive inbound email 108 and generate outbound email 110. For example, campaign manager 102 may send and receive multiple email messages via an email application program (not shown) and one or more data communication networks (not shown).

Campaign manager 102 is also capable of receiving inbound facsimiles 112 and generating outbound facsimiles 114. For example, campaign manager 102 may send and receive multiple facsimiles via facsimile software, facsimile hardware, or other mechanism. Campaign manager 102 is also coupled to two voice applications 116 and 118. In one implementation, voice applications 116 and 118 receive various voice-related calls from any number of callers. In response to these calls, voice applications 116 and 118 request campaign-related information from campaign manager 102, as discussed in greater detail below. Although only two voice applications 116 and 118 are shown in FIG. 1, campaign manager 102 may be coupled to any number of voice applications. Additionally, one or more mobile devices (e.g., cellular phones, wireless devices, portable computing devices, and the like) may be coupled to campaign manager 102.

Campaign manager 102 is also coupled to an application 120 and a data source 122. Application 120 can perform any function that supports campaign manager 102 or requests support from campaign manager 102. Data source 122 provides various types of data to campaign manager 102, such as caller identity information, call history data, and the like. A storage device 124 is also coupled to campaign manager 102. Storage device 124 stores various types of data used during the operation of campaign manager 102. Although FIG. 1 shows one application 120, one data source 122, and one storage device 124, campaign manager 102 may be coupled to any number of applications, data sources, and storage devices.

Specific examples discussed herein relate to voice-based campaigns and voice-based advertisements (e.g., playing voice or other audio-based messages to callers). However, the systems and methods discussed herein can be used with any type of campaign and with any type of campaign manager. Alternate types of communication formats include text messages, instant messages, audio files, text attachments, and the like. The described systems and methods may be implemented as a stand-alone system or may be incorporated into one or more other systems.

Figure 2:
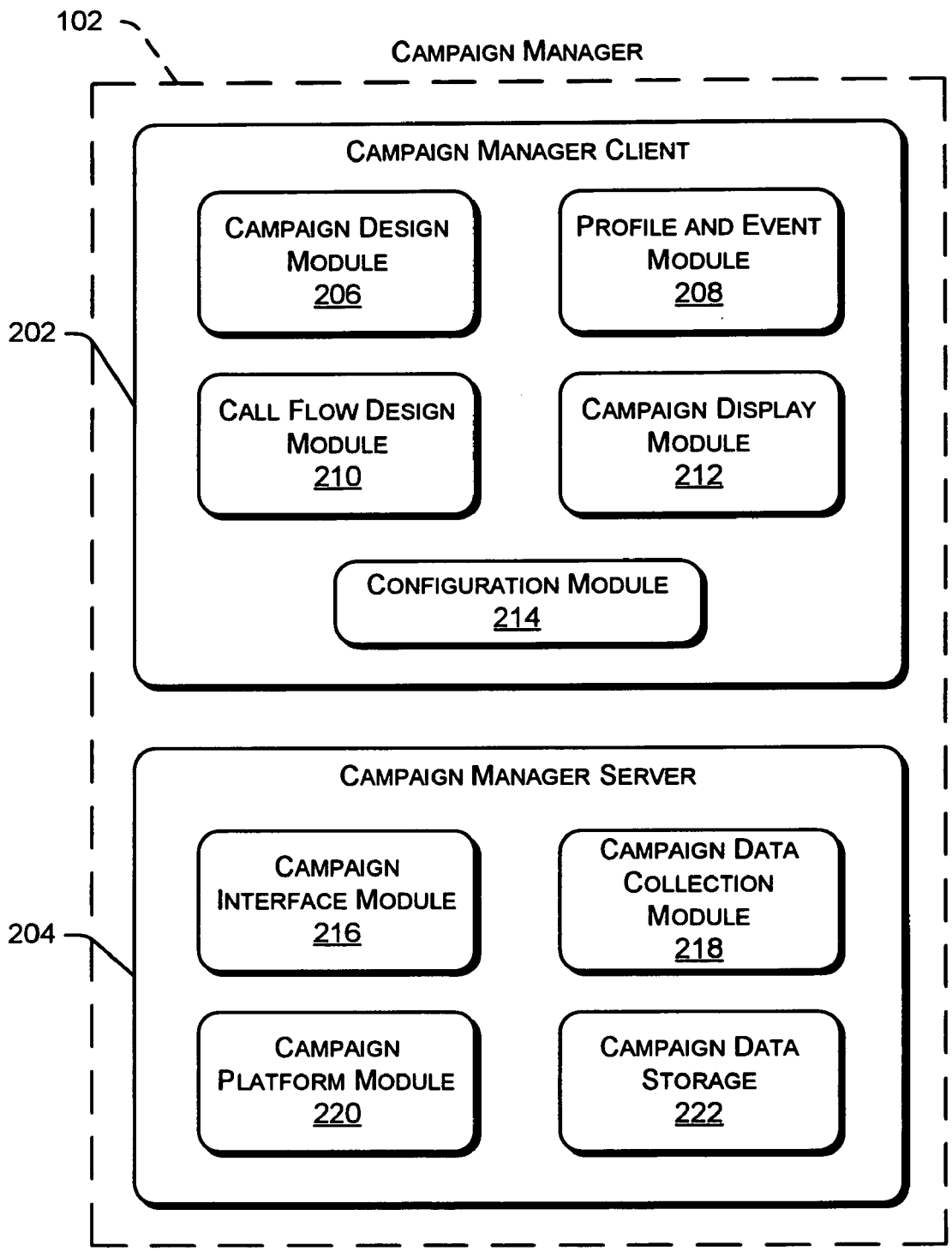
FIG. 2 is a block diagram illustrating various components of an example campaign manager.

FIG. 2 is a block diagram illustrating various components of the example campaign manager 102. In the embodiment of FIG. 2, campaign manager 102 is represented using a client-server architecture. In this embodiment, campaign manager 102 includes a campaign manager client 202 and a campaign manager server 204. In a particular implementation, campaign manager client 202 is a Web client. Campaign manager client 202 provides for the unified control of one or more campaigns.

Campaign manager client 202 contains a campaign design module 206, which allows a user to define a campaign. This campaign definition includes, for example, a campaign name, data sources and mappings, targeting rules and profiles, as well as call flow transitions. Campaign manager client 202 also contains a profile and event module 208, which allows a user to define a caller profile. An example caller profile includes the name of the profile, data sources and mappings, and assignment rules. Profile and event module 208 also allows a user to define an event, such as the event name, data sources and mappings, and event trigger rules.

Campaign manager client 202 also contains a call flow design module 210 and a campaign display module 212. Call flow design module 210 allows a user to create and edit a campaign call flow. Campaign display module 212 allows a user to view a graphical representation of key performance indicators associated with a particular campaign. Campaign manager client 202 further contains a configuration module 214, which allows developers to configure campaigns and allows users to specify profile-based configuration settings for various applications.

Campaign manager server 204 contains a campaign interface module 216, which allows developers to expose campaign activation points (discussed below) at "design time" and execute associated campaigns at "run time" within an application. Campaign manager server 204 further contains a campaign data collection module 218, which collects historical transaction and metric data pertaining to one or more campaigns. Campaign manager server 204 also contains a campaign platform module 220, which provides various interface components and other framework. Campaign platform module 220 also includes data integration functions, data communication functions, user authentication, and call logging functions for multiple campaigns. Campaign manager server 204 also includes campaign data storage 222, which stores various data related to multiple campaigns. In a particular implementation, campaign platform module 220 "plays" one or more voice campaigns. For example, campaign platform module 220 may generate VXML (voice extensible markup language) for a non-interactive campaign or an interactive campaign.

In addition to the data stored by campaign data storage 222, campaign manager 102 may also receive data and other information from any number of different sources, such as marketing applications, enterprise applications, legacy systems, data sources, databases, and the like.

In a typical environment, campaign management includes a variety of functions, such as research and analysis of market and customer data. For example, if sales of an existing category of product or service increase quickly, a business may consider a campaign to make customers (or potential customers) aware of products or services from that business in the particular category. After a particular campaign is defined, the process identifies the people being targeted and determines how to reach those people. Execution of the campaign involves one or more functions performed across one or more channels. For example, a particular campaign may include mailing an announcement that contains an invitation to call the business to learn more about a particular product or service. Response to the campaign is monitored and stored for future campaign planning and analysis. Campaign performance is measured during the campaign and after the campaign is completed.

Particular embodiments discussed herein focus on campaign execution and performance measurement for audio-based communications. For example, these embodiments provide support for targeting rules, interactive voice campaign execution, prospect-specific response tracking, real-time and historical performance analysis, and capture of customer information. In other embodiments, similar systems and procedures are used for visual-based communications as well as audio- and visual-based communications.

To properly accommodate the various contexts in which a campaign can be invoked, a campaign may have multiple components, such as an entry transition, a body, an exit transition, input and output data, metrics that measure campaign performance, and the set of rules that define the manner in which the campaign is applied. A particular campaign may have multiple entry transitions, bodies, and exit transitions. The various components for each caller are selected based on information known about the caller, the time of day, day of week, and various other factors.

Figure 3:
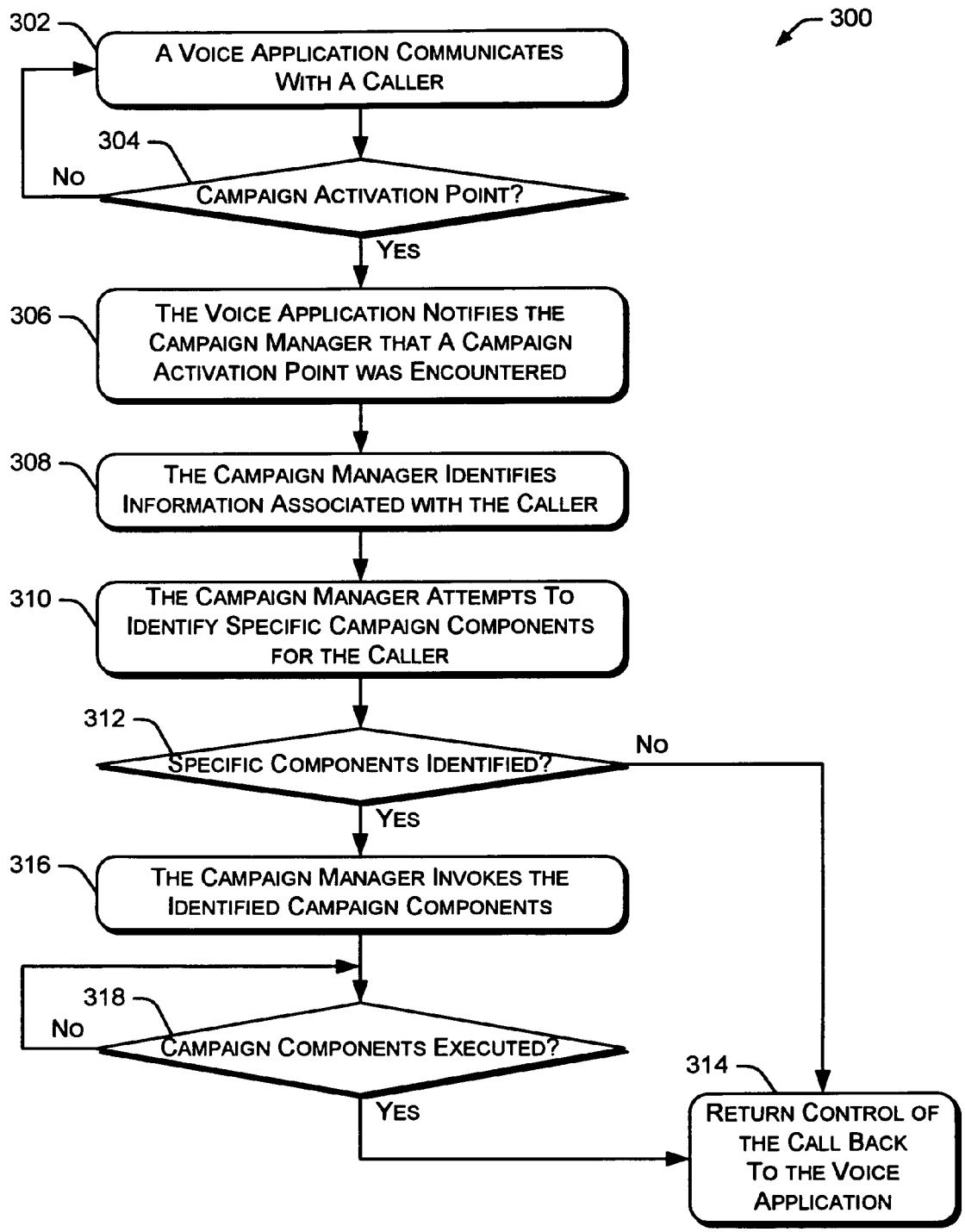
FIG. 3 is a flow diagram illustrating an embodiment of a procedure for managing one or more campaigns.

FIG. 3 is a flow diagram illustrating an embodiment of a procedure 300 for managing one or more campaigns. Initially, a voice application communicates with a caller (block 302). For example, the voice application may be providing the caller with directory service, account information, customer service, technical support, or any other service. A typical voice application provides the caller with a series of options (also referred to as a voice application menu hierarchy) that permit the caller to navigate to the desired function or information. One or more campaign activation points are identified within the menu hierarchy. Each campaign activation point represents a predetermined point at which an associated campaign is launched. The determination of where to place campaign activation points within the menu hierarchy is discussed herein.

Procedure 300 continues by determining whether the caller has navigated to a campaign activation point (block 304). If not, the voice application continues communicating with the caller until a campaign activation point is reached. When a campaign activation point is reached, the voice application notifies the campaign manager that a campaign activation point was encountered (block 306). The campaign manager then identifies information associated with the caller (block 308). Next, the campaign manager attempts to identify specific campaign components for the caller (block 310). As mentioned above, specific campaign components may include an entry transition, a body, and an exit transition.

If the campaign manager does not identify specific campaign components for the caller, procedure 300 branches to block 314, which returns control of the call back to the voice application. If the campaign manager identifies specific campaign components for the caller, procedure 300 branches from block 312 to block 316, where the campaign manager invokes the identified campaign components. The procedure then continues to block 318, which determines whether all campaign components have been executed. If any components remain to be executed, the procedure waits at block 318 until all campaign components are fully executed. After all campaign components are fully executed, the procedure continues to block 314, which returns control of the call back to the voice application.

In alternate embodiments, procedure 300 does not return control of the call back to the voice application after executing all campaign components. Instead, procedure 300 may pass control of the call to a different application, may transfer the call to a call center queue, or may disconnect the call as determined by the campaign exit rules.

To accommodate a variety of contexts in which a campaign may be invoked, a campaign may have multiple "campaign views". In one example, campaign views include an entry transition, a body, an exit transition, input data, output data, metrics to measure the campaign's performance, and a set of rules that define if, when, and how the campaign is applied. A campaign view's entry transitions, body, and exit transitions are optional. If a campaign view is defined without entry transitions, body, and exit transitions, the campaign is essentially a campaign reporting object.

The following Table identifies and describes various components and terms used when describing and defining a campaign. Certain campaigns may use a portion of the items shown in Table 1.

TABLE 1

| Item | Description | Example |
| --- | --- | --- |
| Caller | A person who interacts with the system | A customer or a prospect |
| Invoking Application | A voice-based application that interacts with the caller and invokes the Campaign Manager | An account information voice self-service application |
| Profile | A categorization of the caller based on caller data and/or demographic information | "Affluent Homeowner" - A homeowner with a home valued over $1M |
| Profile Rule | A rule that determines whether a caller should be included in the associated profile | $PropertyValue > $1M and $Income > $100000 |
| Event | An outside or business occurrence | Federal interest rates drop below a threshold; Inventory level exceeds target |
| Event Rule | A rule that determines whether the associated event has occurred | $newAFR − $oldAFR >= 0.25 |
| Campaign | A marketing or communication initiative tied to business drivers | Selling mortgage refinancing |
| Campaign View | A context specific application of a campaign | Selling mortgage refinancing to affluent homeowners who are calling for account balances |
| Campaign Rule | A rule that determines whether an associated campaign view should be offered by the Campaign Manager | Affluent Homeowners and (FedRateDrop or MortgageAge > 5) |
| Entry Transition | A re-usable dialog that transitions between the invoking application and the associated campaign view | "Would you like to hear how you can save $400 per month on your mortgage payment?" |
| Body | A re-usable call flow that generally represents the main portion of the associated campaign view | "With Acme Bank's interest-only mortgages, you can lower your mortgage payment significantly. Here's how it works . . . " |
| Exit Transition | A re-usable call flow that transitions between the associated campaign view and its exit state | "Please hold while I connect you with a representative." |
| Campaign Caller History | A record of a caller's history relative to a campaign. | A caller heard and declined this campaign 3 months ago |
| Profile Assignment Point | A place in an invoking application's call flow which has been designated by the application designer as a sensible point to get/update caller profile assignments | Before the system greeting; before a call flow exit |
| Campaign Activation Point | A place in an invoking application's call flow which has been designated by the application designer as a sensible campaign insertion point; reflects caller intent | After read-back of account balances; reflects the intent of the caller to get account information |
| Associations | A link between two campaign entities | A customer may be associated with one or more profiles |

A particular invoking application may contain any number of campaign activation points, including no campaign activation points. A campaign activation point, which represents caller intent by virtue of its placement within an application or transition, may be associated with any number of campaigns. When a caller reaches a campaign activation point within a voice application, there may be multiple associated campaigns. In this situation, the campaign manager prioritizes the delivery of the multiple associated campaigns according to rankings, prioritizations, and "tie breaker" rules specified by the user. Additionally, a campaign may be associated with any number of events. Campaign history information is maintained for each caller, thereby allowing the campaign manager to determine whether a particular caller has already been offered a specific campaign.

In a particular embodiment, when a call is received by a self-service application, that application invokes the campaign manager and passes the Automatic Number Identification (ANI) and Dialed Number Identification Service (DNIS) information to the campaign manager as input. The campaign manager then attempts to assign the caller to one or more profiles based on evaluation of profile rules. If none of the user-defined profiles match, the caller is assigned to the system's default profile. When assigning profiles, the campaign manager may also attempt to load external profile-related data. For example, the ANI information could be used to retrieve demographic data from a data source, including third party data sources. The data, such as geographic area, affluence level, age, gender, and the like may be used by one or more of the profile assignment rules.

After the campaign manager has finished its profile assignments, it loads the configuration settings associated with the highest weighted profile. If no profile-based configuration settings are available for the assigned profile, the default configuration settings are used. After loading the proper configuration settings, the campaign manager passes control back to the self-service application. The self-service application then plays a welcome prompt according to the configuration settings mapped to the caller's profile. For example, the welcome prompt might play "Welcome to our Premier Executive line" instead of "Welcome to our Premier line" depending on the caller profile. After the welcome prompt is played, the self-service application calls the campaign manager again—to determine whether to offer a campaign and, if so, which campaign to offer.

When targeting campaigns to callers, several factors are considered. In general, callers will lose patience (and businesses will lose customers) if they offer promotions that have little or no value. The serial nature of phone calls magnifies this factor since a caller is unable to ignore an unwanted solicitation—they must wait until the system allows them to move on. However, unlike other marketing channels such as email, direct mail, and the Web where "eyes" are often difficult to attract, the conversational nature of a phone call has the "ears" attention most of the time. Thus, the percentage of "offers" in which a caller is attentive is significantly higher with phone calls than with many other marketing channels.

Factors that influence the applicability of an offer or a message include the caller's profile, which includes personal information as well as behavioral history, current intent, surrounding events, and the campaign history with the caller. Each factor individually can have a significant impact on the success of a campaign. Combining two or more factors can have an event greater impact on the campaign's success.

The following Table identifies various factors and combinations of factors that can impact the success of a campaign.

TABLE 2

| Factor | Examples |
| --- | --- |
| Profile | A caller with a child and over $10,000 in a checking account is a prospect for an educational savings product such as a 529 account. |
|  | A male in their 20s and 30s from New England is a prospect for Boston sports gear. |
|  | A caller who transfers money from their checking to savings account every month is a prospect for an automatic funds transfer service. |
|  | A caller who opted for first class for a previous reservation is a prospect for first class for a new reservation. |
| Event | A caller is a prospect for increased homeowners coverage after a bad storm. |
|  | A caller is a prospect for allergy medications during allergy season. |
|  | A business may choose to promote a product that has reached a high inventory level. |
| Intent | A caller who is changing their address is a prospect for new checks. |
|  | A caller who is paying their power bill is a prospect for an automatic payment service. |
| Campaign History | A caller who has opted out of this campaign in the past is not a strong prospect for this campaign. |
|  | A caller who has opted out of a similar campaign within the last 30 days is not a strong prospect for this campaign. |
|  | A caller who has opted in to this campaign may not be a strong prospect for this campaign. |
| Profile + Event | A male in their 20s and 30s from New England who has previously purchased Patriots merchandise is a strong prospect for ordering the Patriots Super Bowl DVD just after the Super Bowl. |
|  | A caller with a child and over $10,000 in a checking account who transfers money from their checking to savings account every month is a strong prospect for a new educational savings product when the government introduces new, education friendly tax laws. |
| Profile + Intent | A caller who transfers money from their checking to savings account every month (profile) is a strong prospect for an automatic funds transfer service when they are calling to transfer money (intent). |
| Profile + Event + Intent | A caller with a with over $10,000 in a checking account (profile) who is calling to transfer funds to a savings account (intent) is a strong prospect for a CD after the stock market has a bad week (event). |

Campaign Scoring

The campaign manager allows users to define multiple customer profiles for the purpose of campaign targeting. The campaign manager also allows users to assign various profile-specific application configuration settings. A profile definition includes, for example, a profile name, a profile description, and one or more profile rules. Rules may be linked together with various operators such as AND, OR, or NOT. The campaign manager also allows users to activate rules, deactivate rules, and modify existing rules. The default profile cannot be altered, deleted, or deactivated.

The campaign manager further allows users to define multiple events for the purpose of campaign targeting. An event definition includes, for example, the name of the event, a description of the event, and one or more customer rules associated with the event. Events can be activated, deactivated, and modified by a user.

When an inbound call is received, the caller has proactively sought to communicate with the entity receiving the call. Therefore, this type of interaction is referred to as "intent" driven (i.e., driven by the intent of the caller). A caller may have one or more reasons for initiating contact with the entity. Typically, when handling inbound calls, the number of campaigns offered to the caller are limited. If a caller is subject to many different campaigns, the caller is likely to terminate the call. Similarly, if the caller is offered the same campaign more than once, the caller may become frustrated and terminate the call. Thus, it is important to identify campaigns that are most likely to be of interest to the caller, and identify when to offer the campaign to the caller. The campaign manager helps advertisers, marketers, and other users regulate the number of campaigns presented wile optimizing selection of campaigns based on historical call flow usage statistics, campaign conversion (i.e., opt-in) probabilities, and business value.

The campaign manager allows users to define global rules that govern campaign delivery at both a system and session level. For example, session rules allow a user to define policies regarding the maximum number of campaigns that can be delivered on a given call, how many campaigns can be delivered in succession, and how many times a caller declines campaigns before the system stops delivering campaigns to that caller.

By defining various global rules for campaigns, users can prevent callers from receiving too many campaigns during a single call. However, the user must provide information that allows the campaign manager to determine when to offer a particular campaign. For example, should a campaign be offered early in the call flow or should the campaign manager wait for a more targeted point in the call flow that might occur later in the call. However, if the campaign manager waits for a later point in the call flow, that later point may never be reached by the caller. For example, if a generic campaign is offered immediately after a welcome message (when little is known about the caller's intent), a more targeted campaign with a higher likelihood of success may not be offered later in the call due to the policies regarding the number of campaigns that can be delivered. However, if the generic campaign is skipped in favor of a future, more targeted campaign, there is a risk that the call will end before the more targeted campaign is offered. For example, the caller may terminate the call prior to reaching the later point or may follow a different path through the menu hierarchy.

The decision to "offer now" versus "offer later" is based on a risk-benefit analysis. Determining a campaign's "risk" is based on the likelihood that the campaign will be offered during a session and, if offered, the probability that the caller will "opt-in" and eventually take action, such as complete a purchase, enroll in a program, etc. A campaign's "benefit" is based on the value it brings to the business if successful, such as revenue, cost reduction, increased awareness, and the like. Campaign risk can be calculated using call flow statistics and opt-in (or conversion) rate. For example, if 70% of qualified callers ask for account balance and 1% are likely to enroll in a certificate of deposit (CD) offered after account balance is provided, the risk factor is 70%×1%=0.007. In some situations, it is not possible to measure the opt-in rate or the conversion rate. In these situations, the campaign manager allows a user to manually assign a campaign's estimated (or predicted) opt-in rate and conversion rate.

Similarly, a campaign's value can be difficult to calculate directly. Although some campaigns may complete a transaction that has an associated monetary value, other campaigns will be indirect and may not involve specific revenue or cost savings. For example, a bill payment promotion by a financial institution may have more strategic value than immediate monetary value. Customers that sign-up for the financial institution's bill payment service may also sign-up for other products or services from that same financial institution. When the campaign value cannot be specifically calculated, the campaign manager allows a user to manually assign a campaign's estimated (or predicted) value.

Figure 4:
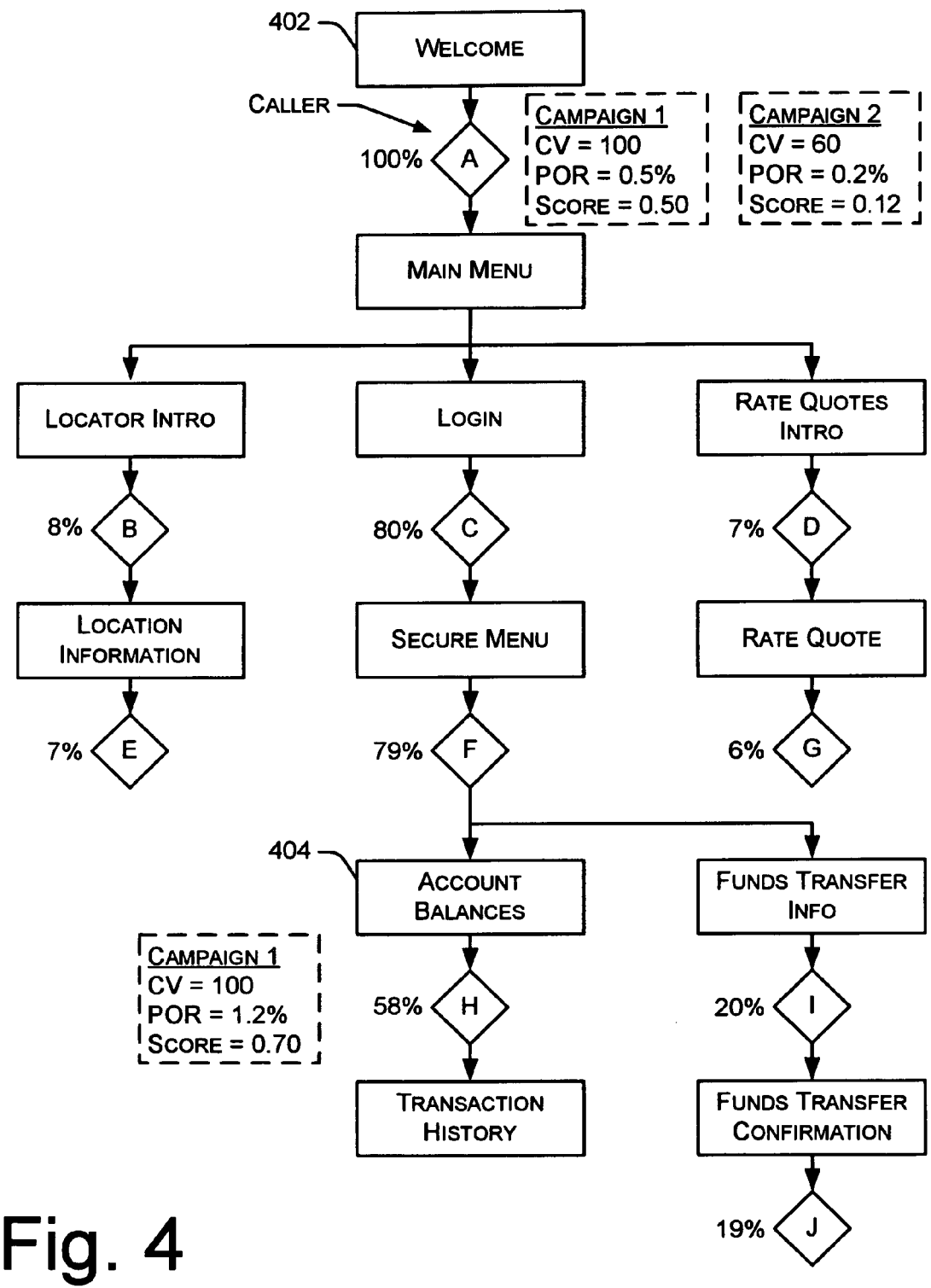
FIGS. 4 and 5 are graphical representations of an example voice-based menu hierarchy.
Figure 5:
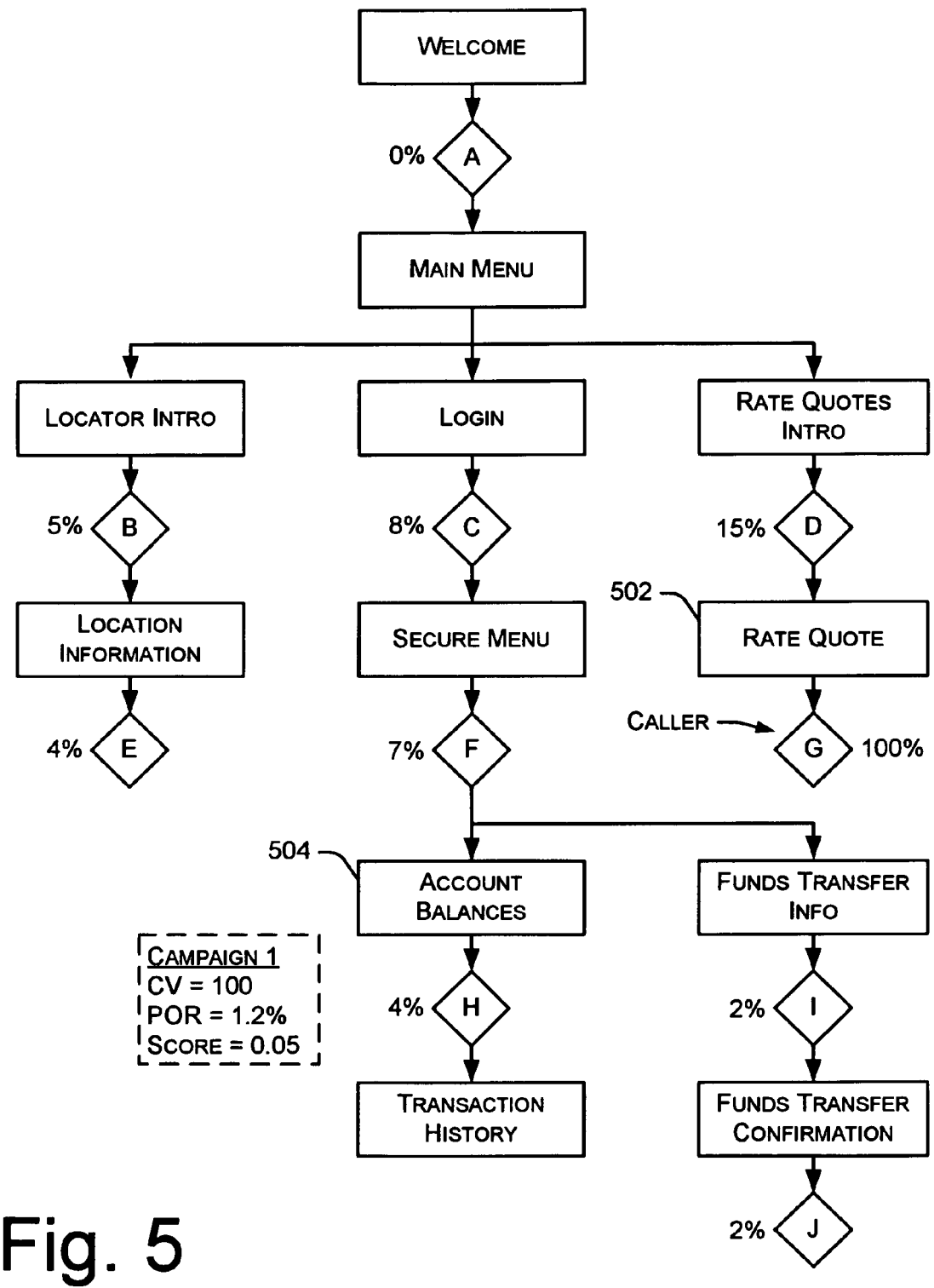

FIGS. 4 and 5 are graphical representations of an example voice-based menu hierarchy. FIGS. 4 and 5 are used to illustrate how a risk-benefit campaign delivery model is used by the campaign manager to determine whether to offer a campaign at a specific activation point or wait for a future opportunity.

Referring to FIG. 4, a caller has heard a welcome prompt (block 402) and has reached campaign activation point A. At this point, the campaign manager knows very little about the caller's intent. In this example, two different campaigns are being targeted to callers. A first campaign (the "SmartCD campaign") offers customers a certificate of deposit (CD) that has an interest rate that automatically increases as Federal interest rates increase. A second campaign (the "home equity line campaign") offers customers a no-fee home equity line of credit.

The campaign manager calculates a campaign "score" for each of the two campaigns. The campaign score is used to rank multiple campaigns and to compare the value of launching a campaign at different points in the menu hierarchy. The campaign score is calculated based on a campaign value (CV), a profile opt-in rate (POR) and the likelihood that the caller will reach particular campaign activation points in the menu hierarchy.

In the example of FIG. 4, the campaign value of campaign 1 is assigned as 100 and the campaign value of campaign 2 is assigned as 60. The campaign values are typically assigned by the person or entity defining the campaign, such as a bank manager in this example. The profile opt-in rate for campaign 1 is 0.5% and the profile opt-in rate for campaign 2 is 0.2%.

The profile opt-in rate is the predicted likelihood that the caller will opt-in to the campaign at a particular point in the menu hierarchy. The profile opt-in rate can be based on historical data, data associated with similar campaigns, or approximations. The campaign score is calculated by multiplying the campaign value with the profile opt-in rate and with the probability that the caller will reach the particular campaign activation point. In this example the caller is already at campaign activation point A, so the probability of reaching that point is 100%. In the example of FIG. 4, at campaign activation point A, the score associated with campaign 1 is 0.50 and the score associated with campaign 2 is 0.12. If the campaign manager was simply considering which campaign to activate at campaign activation point A, the campaign manager would activate campaign 1 due to its higher score.

However, if the campaign manager considers the entire menu hierarchy, the campaign manager will evaluate whether launching a campaign at a different campaign activation point in the menu hierarchy would likely achieve greater success (e.g., a higher opt-in rate for the campaign). For example, the campaign manager may evaluate the campaign scores of other campaign activation points based on the probability that the caller will reach the associated campaign activation point in the menu hierarchy. For example, in FIG. 4, the historical usage statistics predict a 58% chance that a caller will ask for account balances (block 404) after hearing the welcome prompt. Thus, the score associated with activating campaign 1 at campaign activation point H is 0.70 (100*0.012*0.58). Based on the scores calculated in this example, the score associated with activating campaign 1 at campaign activation point H is better than activating campaign 1 at campaign activation point A (score of 0.70 versus 0.50).

In another example, at campaign activation point G in FIG. 4, the campaign value of campaign 1 is 100, the profile opt-in rate is 10.2%, and the likelihood that the caller will reach campaign activation point G is 6%. Thus, the score is 100*0.102*0.06=0.61.

The campaign score associated with each campaign changes as the caller navigates through the menu hierarchy. For example, in FIG. 5 the menu hierarchy is the same as FIG. 4, but the caller has navigated to campaign activation point G and requested a rate quote (block 502). When the caller has reached campaign activation point Q historical data indicates that there is a 4% likelihood that the caller will ask for account balance information (block 504) and reach campaign activation point H. As discussed above with respect to FIG. 4, when the caller is at campaign activation point A, the score for campaign 1 is 0.70. However, when the caller is at campaign activation point H, the score for campaign 1 drops to 0.05 (100*0.012*0.04). This drop is due to the change in likelihood (58% to 4%) that the caller will navigate to campaign activation point H in the future. Thus, the score associated with activating a campaign at different campaign activation points changes as the caller navigates through the menu hierarchy.

Figure 6:
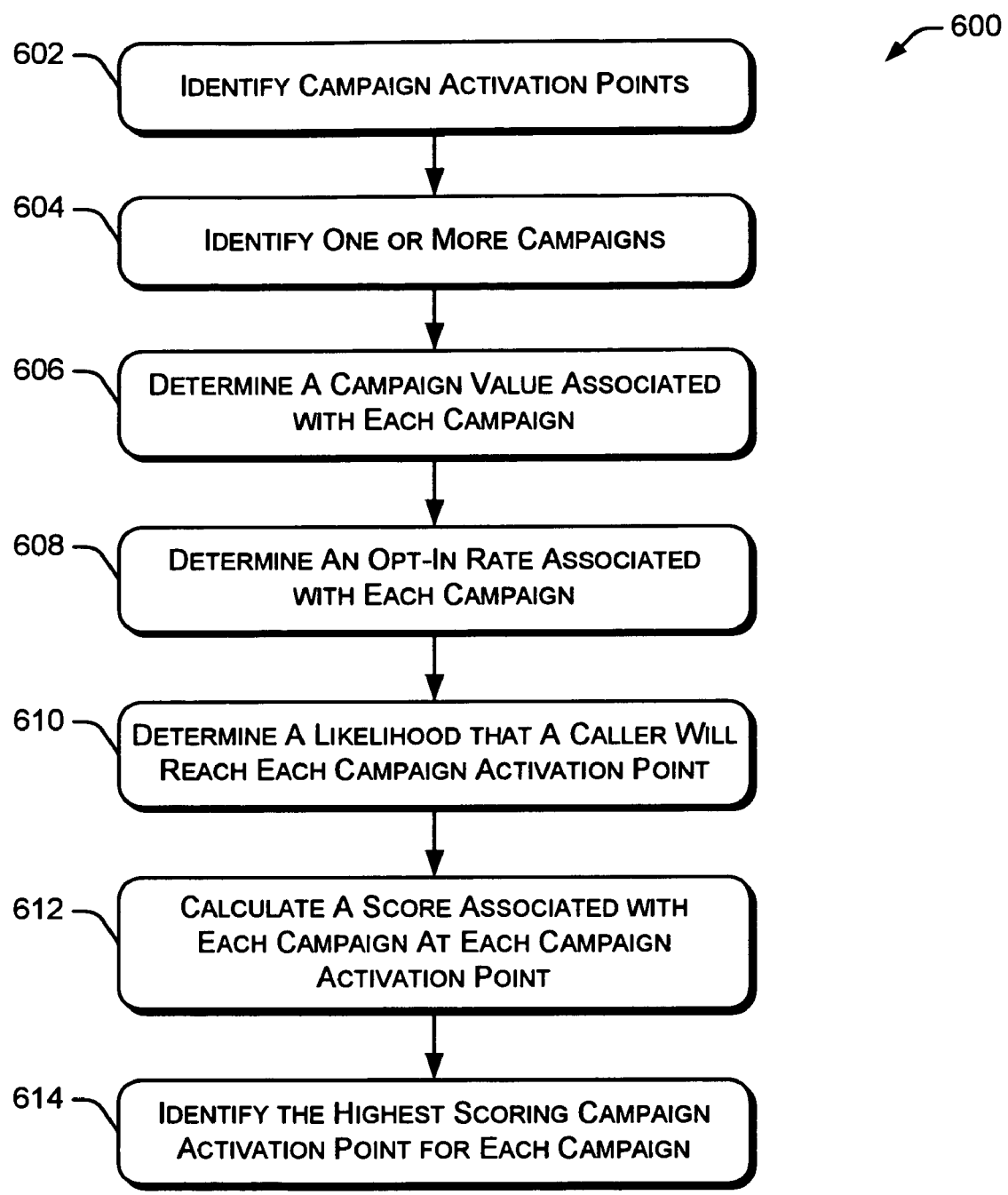
FIG. 6 is a flow diagram illustrating an embodiment of a procedure for assigning scores to various campaign activation points.

FIG. 6 is a flow diagram illustrating an embodiment of a procedure 600 for assigning scores to various campaign activation points. Initially, the procedure identifies one or more campaign activation points in a menu hierarchy (block 602). These campaign activation points represent locations in the menu hierarchy where one or more campaigns can be activated or launched. The procedure continues by identifying one or more campaigns (block 604) and determines a campaign value associated with each campaign (block 606). The campaign value may be assigned based on the expected revenue generated by the campaign, the value of the campaign to future business, or any number of other factors.

Procedure 600 continues by determining an opt-in rate associated with each campaign (block 608) and determining a likelihood that a caller will reach each campaign activation point in the menu hierarchy (block 610). Next, the procedure calculates a score associated with each campaign at each campaign activation point (block 612). As discussed above, this score can be calculated by multiplying the campaign value with the profile opt-in rate and with the probability that the caller will reach the particular campaign activation point. In alternate embodiments, the score can be calculated using any number of factors or parameters, including factors discussed herein.

Based on the caller's current location in the menu hierarchy, procedure 600 identifies the highest scoring campaign activation point for each campaign (block 614). As mentioned above, the highest scoring campaign activation point for each campaign may change as the caller navigates through the menu hierarchy.

In a particular embodiment, the opt-in rate can be specified based on historical data or using estimated opt-in rate information. If an estimated opt-in rate is used, after the first N offers, the estimated opt-in rate may be replaced with the actual opt-in rate calculated based on the first N offers. Additionally, the opt-in rate may vary among different groups of callers. For example, the opt-in rate for a home equity loan campaign may differ among callers that are in different income groups, different age groups, different geographic areas, and the like.

Campaigns can be defined using any number of different parameters and other settings. In one embodiment, each campaign includes one or more of: a campaign name, a campaign description, estimated revenue generated by each instance of the campaign, actual revenue generated by previous instances of the campaign, estimated savings recognized by each instance of the campaign, campaign value, estimated cost to set-up the campaign, and campaign status. Campaigns can be enabled and disabled by the campaign manager based on rules, campaign results, or instructions from an administrator or other user.

Various campaign rules control the activating, enabling, and disabling of campaigns. For example, a particular campaign rule limits a campaign to a single playback for each caller. Other campaign rules define a maximum number of campaigns that are played to a caller during each call, or define a maximum number of campaigns that are played to a caller during a particular time period. Additional campaign rules identify one or more campaigns that should not be played to a caller if that caller rejects another campaign during the same call. Alternatively, a campaign rule may identify one or more campaigns that should not be played to a caller if that caller has already received a particular campaign during the same call, regardless of whether the particular campaign was accepted or declined.

The campaign manager tracks and records various campaign metrics for use in measuring campaign performance, editing campaign parameters and rules, planning future campaigns, and the like. The following Table identifies example campaign metrics that may be tracked and recorded by the campaign manager.

TABLE 3

| Metric | Description |
| --- | --- |
| Calls | The number of calls answered by a voice "site" (e.g., all calls received by a voice processing system). |
| Opportunities | The number of times an associated activation point was reached and the caller was eligible to be offered a campaign. |
| Offers | The number of times the associated campaign was offered. |
| Offer Rate | The percentage of offers per opportunities. |
| Opt-Ins | The number of times an associated campaign was accepted. |
| Opt-In Rate | The percentage of opt-ins per offers. |
| Offer Abandons | The number of abandons during the "offer" portion of a campaign. The offer portion is the entry transition up to the opt-in point. |
| Offer Duration | The duration of the offer portion of a campaign. |
| Campaign Abandons | The number of abandons during a campaign, including the offer portion. |
| Campaign Duration | The duration of a campaign, including the offer portion. |
| A Leads | The number of campaign deliveries yielding an "A" lead. |
| B Leads | The number of campaign deliveries yielding an "B" lead. |
| C Leads | The number of campaign deliveries yielding an "C" lead. |
| D Leads | The number of campaign deliveries yielding an "D" lead. |
| Conversions | The number of campaign deliveries yielding a conversion (e.g., enrollment, order, etc.) |
| Conversion Rate | The percentage of conversions per offers. |
| Units | The number of units sold (or provided) as a result of a campaign. |
| Revenue | The revenue generated from a campaign. |
| Delivery Cost | The cost associated with delivering a campaign (e.g., per-minute-cost * duration) |
| Return On Investment (ROI) | The return on investment (e.g., total revenue to date − total cost to date; total cost = initial cost + delivery cost) |

Alternate embodiments may use additional metrics not shown in Table 3 and/or may omit one or more metrics shown in Table 3.

Measuring the performance of a marketing campaign is important. Changing the wording of a phrase or request can have a large impact on the results of a campaign. Various performance metrics, such as the metrics discussed above with respect to Table 3, are monitored and recorded for analysis and evaluation. Certain metrics can be filtered geographically (e.g., on a state-by-state basis). A caller's state can be identified based on the caller's profile and/or their ANI.

Various goals can be defined for profiles, campaigns, and so forth. Each goal can have an associated visual indicator that displays how well the actual performance corresponds to the goal setting. The goal settings and the associated visual indicators can be set and modified by the user. The user can also define the positions of the various visual indicators with respect to one another. Different color-coding definitions are used to provide a quick indication of whether a particular goal is being met.

In addition to the visual indicators discussed above, reports are generated that identify the values of multiple performance metrics over a period of time.

Figure 7:
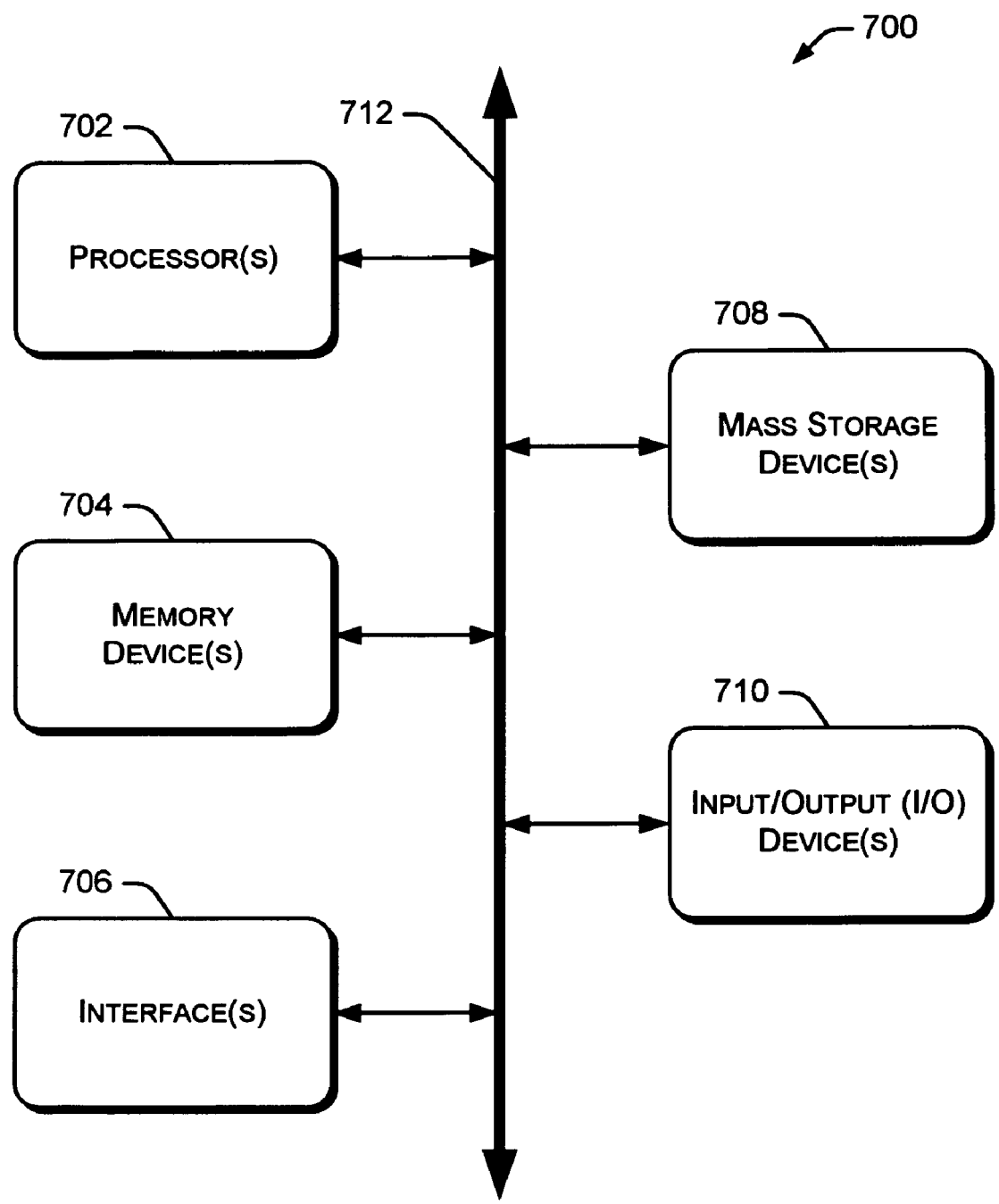
FIG. 7 is a block diagram illustrating an example computing device.

FIG. 7 is a block diagram illustrating an example computing device 700. Computing device 700 may be used to perform various procedures, such as those discussed herein. Computing device 700 can function as a server, a client, or any other computing entity. Computing device 700 can be any of a wide variety of computing devices, such as a desktop computer, a notebook computer, a server computer, a handheld computer, and the like.

Computing device 700 includes one or more processor(s) 702, one or more memory device(s) 704, one or more interface(s) 706, one or more mass storage device(s) 708, and one or more Input/Output (I/O) device(s) 710, all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM)) and/or nonvolatile memory (e.g., read-only memory (ROM)). Memory device(s) 704 may also include rewritable ROM, such as Flash memory.

Mass storage device(s) 708 include various computer readable media, such as magnetic tapes, magnetic disks, optical disks, solid state memory (e.g., Flash memory), and so forth. Various drives may also be included in mass storage device(s) 708 to enable reading from and/or writing to the various computer readable media. Mass storage device(s) 708 include removable media and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Interface(s) 706 include various interfaces that allow computing device 700 to interact with other systems, devices, or computing environments. Example interface(s) 706 include any number of different network interfaces, such as interfaces to local area networks (LANs), wide area networks (WANs), wireless networks, and the Internet.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
    identifying, using one or more processors, a plurality of campaign activation points associated with a voice-based menu hierarchy, the voice-based menu hierarchy being accessed by a plurality of callers;
    identifying a first advertising campaign having an associated first campaign activation point within the voice-based menu hierarchy;
    identifying a second advertising campaign having an associated second campaign activation point within the voice-based menu hierarchy;
    determining a campaign value associated with each of the first and second advertising campaigns;
    determining an opt-in rate associated with each of the first and second advertising campaigns;
    determining a likelihood that callers will reach each of the first and second campaign activation points; and
    calculating a score associated with each of the first and second advertising campaigns for each of the first and second campaign activation points by multiplying together the campaign value, the opt-in rate, and the likelihood that callers will reach the associated campaign activation point.

2. A method as recited in claim 1 further comprising determining a highest score among the first and second advertising campaigns.

3. A method as recited in claim 1 wherein calculating the score associated with each of the first and second advertising campaigns is dependent on a current call location within the voice-based menu hierarchy.

4. A method as recited in claim 3 wherein determining the likelihood that callers will reach each of the first and second campaign activation points is dependent on the current call location within the voice-based menu hierarchy.

5. A method as recited in claim 1 wherein the campaign values are set by an administrator of the first and second advertising campaigns.

6. A method as recited in claim 1 wherein the opt-in rates are the predicted likelihood that a caller will opt-in to the associated advertising campaign.

7. A method as recited in claim 1 further comprising recalculating the score associated with each of the first and second advertising campaigns as a caller's location in the voice-based menu hierarchy changes.

8. A method comprising:
    displaying a plurality of action blocks contained in a voice-based menu hierarchy, the voice-based menu hierarchy being accessed by a plurality of callers;
    displaying a plurality of campaign activation points contained in the voice-based menu hierarchy, each of the campaign activation points being associated with an advertising campaign;
    displaying a first advertising campaign value proximate a first campaign activation point;
    displaying an opt-in rate associated with a first advertising campaign proximate the first campaign activation point;
    calculating, using one or more processors, a score associated with the first advertising campaign by multiplying together the first advertising campaign value, the opt-in rate, and a percentage likelihood a caller will reach the first campaign activation point;
    displaying the score associated with the first advertising campaign proximate the first campaign activation point;
    displaying a second advertising campaign value proximate a second campaign activation point;
    displaying a second opt-in rate associated with a second advertising campaign proximate the second campaign activation point;
    calculating, using the one or more processors, a second score associated with the second advertising campaign by multiplying together the second advertising campaign value, the second opt-in rate, and a percentage likelihood a caller will reach the second campaign activation point; and displaying the second score proximate the second campaign activation point.

9. A method as recited in claim 8 further comprising displaying an indicator identifying a current location of a caller in the voice-based menu hierarchy.

10. A method as recited in claim 8 further comprising highlighting a highest scoring campaign activation point among the first and second campaign activation points.

11. An apparatus comprising:
a memory to store data associated with a voice-based menu hierarchy, the voice-based menu hierarchy being accessed by a plurality of callers; and
one or more processors coupled to the memory and configured to:
identify a plurality of campaign activation points associated with the voice-based menu hierarchy;
identify a first advertising campaign having an associated first campaign activation point within the voice-based menu hierarchy;
identify a second advertising campaign having an associated second campaign activation point within the voice-based menu hierarchy;
determine a campaign value associated with each of the first and second advertising campaigns;
determine an opt-in rate associated with each of the first and second advertising campaigns;
determine a likelihood that callers will reach each of the first and second campaign activation points; and
calculate a score associated with each of the first and second advertising campaigns for each of the first and second campaign activation points by multiplying together the campaign value, the opt-in rate, and the likelihood that callers will reach the associated campaign activation point.

12. An apparatus as recited in claim 11 further comprising displaying the score associated with the first advertising campaign proximate the first campaign activation point.

13. An apparatus as recited in claim 11 further comprising:
displaying the score associated with the first advertising campaign proximate the first campaign activation point; and
displaying the score associated with the second advertising campaign proximate the second campaign activation point.

14. An apparatus as recited in claim 11 wherein the score associated with each of the first and second advertising campaigns is calculated based on a caller's current location in the voice-based menu hierarchy.

\* \* \* \* \*